United States Patent Office 3,474,517
Patented Oct. 28, 1969

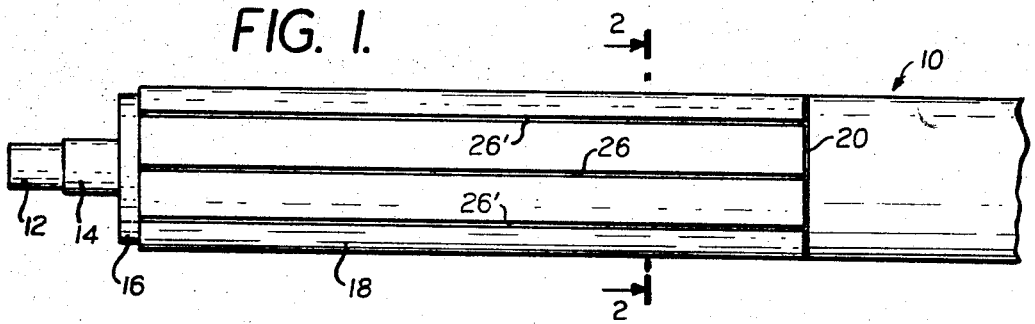
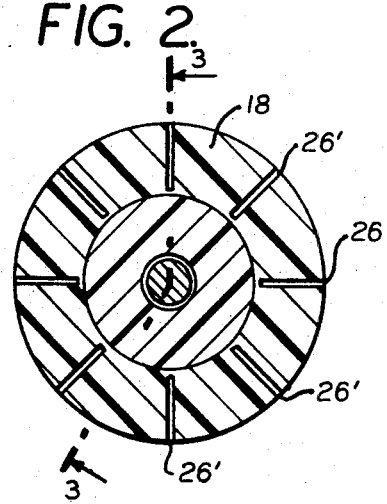
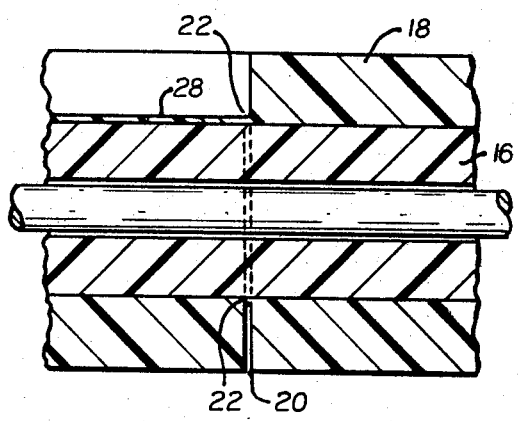
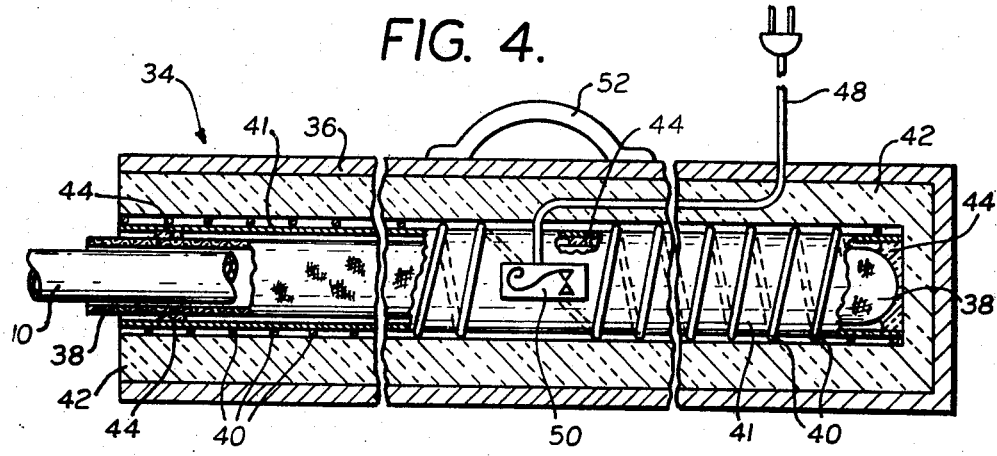

3,474,517
METHOD AND APPARATUS FOR PREPARING CROSS-LINKED POLYETHYLENE CABLES FOR TERMINATIONS AND SPLICES
Eugene C. Menne, Iselin, N.J., assignor to General Cable Corporation, New York, N.Y., a corporation of New Jersey
Filed Apr. 6, 1967, Ser. No. 628,967
Int. Cl. H01r 43/00
U.S. Cl. 29—427                                    9 Claims

ABSTRACT OF THE DISCLOSURE

Method and apparatus for removing semi-conducting insulation shield of conducting cross-linked polyethylene from cross-linked polyethylene insulation on an electric conductor or cable, in preparation for terminating and splicing, without the customary grinding, scraping, sanding and shaving. The insulation is left clean of any conducting material and with its original round shape for use in conventional terminations. The semi-conducting layer is cut through for substantially its full depth at the region of removal and is then subjected to controlled heat to make it easily and cleanly peelable from the underlying insulation.

BRIEF DESCRIPTION OF THE INVENTION

This invention relates to a method and apparatus for preparing shielded cross-linked polyethylene conductors and cables for terminating and splicing.

The problem in terminating and splicing cross-linked polyethylene cables is in removing the semi-conducting insulation shield which is firmly adhered to the underlying insulation layer at normal ambient installation temperatures. Known methods of removing the semi-conducting insulation shield include grinding, scraping, sanding and shaving. These are time-consuming operations and the quality differs greatly with different personnel. Most commercially available terminations are designed to accommodate a specific outside diameter of the extruded insulation and to fit a perfectly circular cross section. Neither condition is easily attained when using any of the previously known methods.

It is an object of the invention to sever, score, or cut the end portion of the shield at a line where it is to be removed from the rest of the shield; and then to heat the end portion to a degree at which it can be easily detached from the underlying insulation. The operation is faciltated by making longitudinal scores or cuts in the portion of the shield which is to be removed along substantially the full length of that portion.

For purposes of this invention, the terms "score" and "cut" are used synonymously; but they are used to designate an operation that severs material on one side of the score or cut from material on the other side, as opposed merely to denting the material, as in the case of "score" lines of some folding processes. Cutting of the shield preferably extends through substantially the full thickness of the shield; but some uncut shield material may remain at the bottom of a cut and may be torn in the subsequent stripping operation, as will be described.

The heating of the shield can be done with an electric heat gun or various other apparatus. It is another object of the invention to provide apparatus for carrying out the method of this invention; and the preferred embodiment of the apparatus includes a portable oven with a heat-control thermostat. The end of the cable from which the shield is to be removed is placed in the oven for a predetermined time at the controlled temperature.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIGURE 1 is a fragmentary view of a cable showing part of an insulation shield with cuts preparatory to removal of the shield, in accordance with this invention;

FIGURE 2 is an enlarged sectional view taken on the line 2—2 of FIGURE 1;

FIGURE 3 is a sectional view taken on the line 3—3 of FIGURE 2; and

FIGURE 4 is a diagrammatic sectional view of apparatus for removing a cable shield in accordance with this invention.

DETAILED DESCRIPTION OF THE INVENTION

FIGURE 1 shows an electric cable 10 having a center conductor 12, which may be solid or stranded, and an inner conductor shielding layer 14 that is applied immediately over the conductor 12. This cable core, comprising the conductor 12 and the inner layer 14, is covered with electrical insulation 16; and outside of the electrical insulation 16 there is a semi-conducting insulation shield 18.

The shield 18 is made of cross-linked polyethylene loaded with carbon black or other material to make the shield semi-conducting. The insulation 16 is also made of cross-linked polyethylene and the shield 18 and insulation 16 are securely bonded to one another as the result of the process by which such cables are manufactured. The shielding layer 14 may be made of similar material to that of the shield 18. It will be understood that mechanically equivalent shield and insulation combinations, made of other materials, can be separated by the method of this invention; and the description herein is for the preferred embodiment of the invention.

The shield 18 is first cut along a circumferential line 20. This cut at the line 20 extends substantially through the full thickness of the shield 18. It is, however, difficult to cut through the shield for its full depth without risk of cutting into the surface of the underlying insulation 16. In order to provide a factor of safety, the cut along the line 20 can be made with a depth slightly less than the radial thickness of the shield 18 so as to leave a thin portion 22 of shielding at the bottom of the cut which is made on the line 20.

The shield 18 is then cut along a line 26 extending from the line 20 to the end of the shield 18. This cut along the line 26 is for substantially the full depth of the shield 18; but to provide a factor of safety to protect the insulation 16 from being cut, the longitudinal cut along the line 26 is preferably slightly less than the radial thickness of the shield so as to leave a thin portion of shield material 28 at the bottom of the longitudinal cut.

The removal of the shield can be made easier, particularly with larger sizes of cable, if a plurality of longitudinal cuts are made along other lines 26' at angularly spaced locations around the circumference of the cable. This relation of the longitudinal cuts along the lines 26 and 26' is best shown in FIGURE 2.

The next step is to heat the shield 18. The heating can be done in various ways, but it is preferable to apply the heat from outside the shield 18 and around the entire circumference of the shield 18. The heat should be applied rapidly so as to heat the shield 18 more strongly than the insulation 16 is heated. The advantage of this uneven heating is that the shield 18 expands more than the underlying insulation 16 and tends to pull away from the insulation 16 because of the differential expansion.

The heating should not be too rapid because it is undesirable to melt the surface of the shield 18 before the interface between the shield 18 and insulation 16 has reached the temperature at which the shield can be removed easily from the insulation. The temperature to which the interface is to be heated, in the case of cross-linked polyethylene, is between 105° and 110° C. This temperature is near the softening point of the polyethylene and thus the heat weakens the bond between the polyethylene shield 18 and the underlying insulation 16. The cross-linked polyethylene undergoes a phase transition at about this temperature range. When using the invention for other materials, the temperature range may be different, depending upon the softening point of the particular plastic involved.

The shield 18 may be loaded with from 30% to 40% by weight of carbon black in order to obtain the semi-conducting properties desired for the shield. In such a case, the carbon black increases the rate of heat transmission through the shield, as compared to heat transmission through the insulation 16, which does not contain the carbon black. This facilitates the differential heating which tends to pull the shield 18 loose from the insulation 16. Even if the loading is a material other than carbon black, this other material, which adds electrical conductivity to the shield 18 will almost always increase the heat conductivity also.

Experience has shown that the desired results are obtained by placing the portion of the cable, from which the shield is to be removed, in an oven or other heated space where the circumference of the shield is subjected to a temperature of approximately 190° C. By continuing the heating for a period of from about a half hour to one hour, depending upon the size of the cable, the interface between the shield 18 and insulation 16 reaches a temperature between approximately 105° and 110° C. The cable is then removed from the region of heating and while the shield is at the elevated temperature, the portions of the shield between the lines 26 and 26' are peeled back, starting at the end of the cable and pulling the shield material back toward the line 20. The thin portions of material 28, which span the bottom of the angularly spaced cuts along the lines 26 and 26', are torn during this peeling operation; and they tear easily because the material is at or near its softening point.

As each strip of the shield is pulled back to a location close to the line 20, care must be taken to avoid pulling the shield 18, beyond the cut 20, loose from the insulation 16. This is done by pulling the strip of shield in a circumferential direction tangent to the insulation 16 so that the thin portion of material 22 at the bottom of the circumferential cut along the line 20 tears without exerting any radial pull which would tend to separate the shield 18 from the insulation 16 beyond the line 20.

FIGURE 4 shows apparatus for heating the end portion of a cable from which the insulation shield is to be removed. This apparatus is a portable oven 34 comprising a housing 36 in which there is a cylindrical wire mesh cage 38 into which a cable end may be inserted for heating. The cage 38 preferably is centered in the housing 36 and is surrounded by an electric heating coil 40 covered with heat insulation 42. The heating coil 40 is mounted on a tube 41 of material having a high rate of heat transmission, e.g. a copper tube. The cage 38 is of large enough diameter to receive the end portion of the cable 10 for the full length of the part of the cable from which the insulation is to be removed and for at least some distance beyond this end portion. The cage 38 is supported within the tube 41 spaced from the tube wall by spaced heat insulating supports 44 so that cable inserted into the cage will never come into direct contact with the heating surface, i.e. the copper tube.

Electric current is supplied to the coil 40 from a drop cord 48; and there is a thermostat 50 in the oven for controlling the temperature. The housing 36 is shown with a handle 52 by which it is carried. Although the apparatus shown in FIGURE 4 provides a convenient means for heating the cable quickly and with good control of the temperature, it will be understood that the method of this invention can be carried out with any other suitable heating.

Various changes and modifications can be made in the embodiment of the invention described herein, and some features can be used in different combinations without departing from the invention as defined in the claims.

What is claimed is:

1. The method of preparing for terminating and splicing an electric cable having plastic insulation thereon covered by a semi-conducting shield that contains plastic material which is bonded to the insulation when the cable is manufactured, which method comprises making a cut through the shield all around the cable and for substantially the full depth of the shield, making a longitudinal cut through the shield for substantially the full depth thereof from the first cut to the end of the portion of the shield that is to be removed, heating the cable shield to a substantially higher temperature than the insulation and to a temperature approaching th softening point of the plastic of the shield and continuing the heating until the cable is heated through to the interface between the shield and insulation, and then removing the shield from the insulation.

2. The method described in claim 1 characterized by the cable having insulation made of cross-linked polyethylene and the shield being made of cross-linked polyethylene loaded with conducting material, and the heating of the shield being carried to a temperature at which the cross-linked polyethylene undergoes a phase transition and becomes weaker as it approaches its softening point.

3. The method described in claim 2 characterized by the shield being loaded with electric conducting material that also increases the heat conductivity of the shield, and the heat being applied from outside the shield so that the shield heats more rapidly than the insulation and pulls away from the insulation by differential expansion.

4. The method described in claim 3 characterized by the shield being loaded with approximately 30% to 40% by weight of carbon black, and the heating of the shield being carried to a temperature of approximately 105–115° C.

5. The method described in claim 1 characterized by the shield being heated from the outside and more rapidly than the insulation to provide a differential expansion of the shield that causes it to pull radially outward from the insulation and to weaken the bond between the shield and insulation, the plastic being heated to further weaken the bond by bringing the plastic to a temperature approaching its softening point.

6. The method described in claim 5 characterized by heating the end portion of the cable, from which the shield is to be removed, in an enclosed space which is at a temperature of approximately 190° C., keeping the end portion of the cable in the space at said temperature until the surface of the shield reaches a temperature approximating 105–115° C.

7. The method described in claim 5 characterized by the heating being continued for a period of approximately one half to one hour.

8. The method described in claim 1 characterized by the areas of the shield defined by the cuts being removed from the insulation by bending the shield material back toward the first cut.

9. The method described in claim 8 characterized by making a plurality of longitudinal cuts at angularly spaced locations around the circumference of the shield, and immediately upon completion of the heating, stripping the respective areas of the shield between said longitudinal cuts back toward the first cut and to within about one-eighth inch from the first cut, and concluding the stripping of each area by applying force to the shield tangentially of the insulation so as to remove the shield area and to tear it from any uncut part of the shield at the bottom of the first cut without lifting any of the shield beyond the first cut from the underlying insulation.

References Cited

UNITED STATES PATENTS

| | | |
|---|---|---|
| 1,165,176 | 12/1915 | Hornor. |
| 2,120,398 | 6/1938 | Edwards et al. |
| 2,347,956 | 5/1944 | Lansing. |
| 2,636,408 | 4/1953 | Mitchell _____ 29—426 |
| 3,161,088 | 12/1964 | Tolman _____ 81—9.5 |
| 3,237,300 | 3/1966 | Townsend et al. |
| 3,330,036 | 7/1967 | Mahoney _____ 81—9.5 |

CHARLIE T. MOON, Primary Examiner

U.S. Cl. X.R.

29—590, 628; 83—15; 156—344